United States Patent [19]

Berlin et al.

[11] 4,076,742

[45] Feb. 28, 1978

[54] ANAEROBIC COMPOSITION COMPRISING OLIGOCARBONATEACRYLATES BENZOYL PEROXIDE AND FERROCENE

[76] Inventors: Alfred Anisimovich Berlin, Leninsky prospekt, 57, kv. 9, Moscow; Khaim-Mordkhe Aronovich Brikenshtein, p/o Chernogolovka, ulitsa, Vtoraya 5, kv. 1, Moskovskaya oblast, Noginsky raion; Nikolai Sviridovich Gavrjushenko, ulitsa Karla Marxa, 20, kv. 181, Moscow; Fedor Ivanovich Dubovitsky, Vorobievskoe shosse, 2, kv. 12, Moscow; Tamara Yakovlevna Kefeli, Krasnoprudnaya ulitsa, 22/24, kv. 103, Moscow; Raisa Vasilievna Kronman, Prospekt Lenina, 30, korpus 2, kv. 47, Gorky; Ljudmila Alexeevna Konkhina, ulitsa Tereshkovoi, 58, kv. 67, Dzerzhinsk Gorkovskoi oblasti; Natalya Lvovna Marshavina, prospekt Vernadskogo, 95/2, kv. 252; Galina Leonidovna Popova, 11 Parkovaya ulitsa, 44, korpus 3, kv. 39, both of Moscow; Anna Alexandrovna Radugina, p/o Chernogolovka, ultisa pervaya, 32, kv. 59, Moskovskaya oblast, Noginsky raion; Jury Mikhailovich Sivergin, Sobinovsky pereulok, 1, kv. 12, Moscow; Iosif Grigorievich Sumin, prospekt Lenina, 81, kv. 58, Dzerzhinsk Gorkovskoi oblasti; Nikolai Nikandrovich Tvorogov, Matveevskaya ulitsa, 10, korpus 2, kv. 22, Moscow; Galina Pavlovna Shilova, p/o Chernogolovka, ulitsa Pervaya, 2a, kv. 21, Moskovskaya oblast, Noginsky Raion; David Alexeevich Kardashov, Frunzenskaya naberezhnaya, 52, kv. 57, Moscow, all of U.S.S.R.

[21] Appl. No.: 595,682

[22] Filed: Jul. 14, 1975

[51] Int. Cl.² .................. C08F 4/34; C08F 18/24; B01F 9/00
[52] U.S. Cl. .................. 260/47 UA; 260/31.2 R; 260/31.2 XA; 260/47 XA; 260/77.5 UA

[58] Field of Search .............. 260/47 UA, 77.5 UA, 260/49 XA, 31.2 XA, 31.2 R

[56] References Cited

U.S. PATENT DOCUMENTS

| | | | |
|---|---|---|---|
| 3,125,480 | 3/1964 | Karo et al. | 156/310 |
| 3,203,941 | 8/1965 | Krieble | 260/89.5 |
| 3,218,305 | 11/1965 | Krieble | 260/89.5 |
| 3,591,438 | 7/1971 | Toback et al. | 156/310 |
| 3,716,571 | 2/1973 | Berlin | 260/47 XA |
| 3,855,040 | 12/1974 | Malofsky | 260/865 |
| 3,880,956 | 4/1975 | Skoultchi | 260/77.5 |
| 3,890,273 | 6/1975 | Saito | 260/47 UA |

*Primary Examiner*—Herbert J. Lilling
*Attorney, Agent, or Firm*—Haseltine, Lake & Waters

[57] ABSTRACT

An anaerobic composition on the basis of a polymerizable oligomer of the acrylic series, which comprises a polymerization inhibitor, a polymerization initiator combined with a polymerization accelerator, and a plasticizer, wherein, in accordance with the invention, the polymerizable oligomer of the acrylic series is at least one oligocarbonateacrylate of the general formula

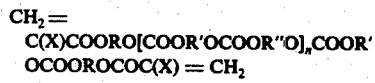

where
X is —H, —CH₃ or a halogen;
R is a glycol or bisphenol radical;
R' is a glycol, bisphenol or polyol radical;
R" is an alkyl or aryl radical;
n = 0 or ≧ 1;

the polymerization inhibitor is bis(5-methyl-3-tert.butyl-2-oxyphenyl)methane; the polymerization initiator is benzoyl peroxide combined with ferrocene as the polymerization accelerator taken in a ratio of from 1:1 to 1:0.005; and the plasticizer is a polymerizable acrylic acid ester of the formula

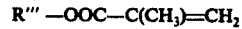

where R''' is alkyl radical $C_8$–$C_{12}$.

4 Claims, No Drawings

ANAEROBIC COMPOSITION COMPRISING OLIGOCARBONATEACRYLATES BENZOYL PEROXIDE AND FERROCENE

The present invention relates to polymerizable compositions, viz. to anaerobic compositions for fixing, hermetically sealing or packing the assemblies of various products. The usefulness of such compositions derives from their ability to solidify after being applied to various kinds of surfaces under anaerobic conditions to form solid infusible and insoluble polymers having a space-network structure and exhibiting required operating properties.

The prior art anaerobic compositions comprise oligomers or monomers with polymerizable end groups, including acrylic groups, inhibitors, initiating additives made up of initiators proper and accelerators of their decomposition, and plasticizers, which differ one from another by the chemistry of the constituents or by their quantitative ratios.

The most popular polymerizable constituents are compounds of the acrylic series of the general formula

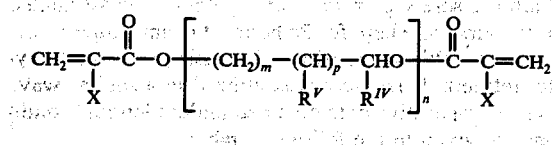

where
$R^{IV}$ = —H, —CH$_3$, —C$_2$H$_5$—, —CH$_2$OH,

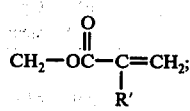

X = H, a halogen or an alkyl radical;
$R^V$ = H, —OH, or

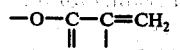

radical;
m, p and n are integers greater than 0 or 0

It is likewise known in the art to employ anaerobic compositions wherein the polymerizable component is one of the oligomeric esters having end groups of the acrylic series of the general formula:

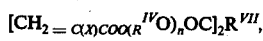

where
X = —H, —Cl, —CH$_3$ or —C$_2$H$_5$;
$R^{VI}$ = —(CH$_2$)$_2$—, —CH$_2$—C(CH$_3$)H— or —(CH$_2$)$_3$;
$R^{VII}$ = —(CH$_2$)$_m$—, ortho-, meta-, para-phenyl, —CH=CH— or —CH=C(CH$_3$)—;
m = 0–8;
n = 1–4.

The initiator may be cumene hydroperoxide, cyclohexane or methylethylketone hydroperoxides, benzoyl peroxide, with additives of triethylamine, piperidine, dimethylaniline etc.

The most wide-spread inhibitors in the prior art compositions are hydroquinone, benzoquinone and the like.

The prior art anaerobic compositions are able to withstand storage without loss of their properties for periods from several months to a year.

The quality of each anaerobic compositions is determined by testing them in screw assemblies for the maximum moment of friction.

The prior art compositions have maximum moments of friction on the order of 480 kgf.cm.

All prior art anaerobic compositions have a serious disadvantage which consists in their poor hardening on certain metal surfaces, inter alia, on cadmium surfaces. To speed up the rate of hardening in such cases, the metal is usually surface-treated with a variety of accelerators, viz. solutions of amines, isocyanates or salts of fatty acids and metals of variable valency in chlorinated hydrocarbons. Most of such accelerators give off an offensive odour and are toxic.

Besides, the anaerobic compositions according to the above-cited patents fail to provide adequate resistance to dynamic stress, an essential property for products exposed to strong vibrations at high pressure levels.

It is an object of the present invention, therefore, to provide anaerobic compositions capable of setting on metal surfaces within a matter of several minutes.

It is another object of the present invention to provide an anaerobic composition capable of withstanding prolonged storage in a ready-for-use form and requiring no toxic accelerators for hardening.

It is a further object of the present invention to provide an anaerobic composition offering a higher resistance to dynamic stress than the currently known compositions.

The foregoing objects are attained by the provision and utilization of an anaerobic composition which, in accordance with the invention, unlike those known heretofore, consists of at least one oligomer containing in the molecule carbonate and end or regularly arranged unsaturated groups of acryl type of the general formula

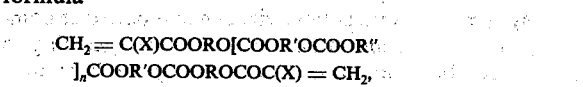

where
X = —H, —CH$_3$ or a halogen;
R is a glycol or bisphenol radical;
R' is a glycol, bisphenol or polyol radical;
R" is an alkyl or aryl radical;
n = 0 or. ≧ 1;

taken at the rate of 98 parts by weight; the inhibitor is bis-(5-methyl-3-tertiary butyl-2-oxyphenyl)-methane taken in a quantity of from 0.02 to 0.03 part by weight; the polymerization initiator is benzoyl peroxide combined with ferrocene as the polymerization accelerator taken in the ratio of from 1:1 to 1:0.005, at the rate of from 0.05 to 1 part by weight; and the plasticizer is a polymerizable acrylic acid ester of the formula

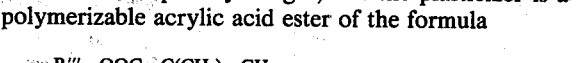

where R''' is alkyl radical C$_8$–C$_{12}$, taken in a quantity of from 2 to 5 parts by weight.

In accordance with the invention, the preferred plasticizer of the system is octylmethacrylate.

In one embodiment of the invention, the anaerobic composition, in accordance with the invention, comprises two polymerizable oligocarbonateacrylates, viz. bis(methacryloxyethylene carbonate)tet-raethyleneglycol taken at the rate of 48 parts by weight and bis(methacryloxyethylenecarbonate)diphenylolpropane taken at the rate of 50 parts by weight, as well as bis(5-methyl-3-tertiary butyl-2-oxyphenyl) methane taken at the rate of 0.03 part by weight, benzoyl peroxide combined with ferrocene in the ratio of 1 benzoyl peroxide to 0.1 ferrocene taken in a quantity of 0.275 part by weight, and octylmethyacrylate taken at the rate of 2 parts by weight.

In an alternative embodiment of the invention, the anaerobic composition comprises, in accordance with the invention, bis(methacrylhydroxyethylenecarbonate) diethyleneglycol taken at the rate of 98 parts by weight, bis(5-methyl-3-tertiary butyl-2-oxyphenyl) methane in a quantity of 0.03 part by weight, benzoyl peroxide combined with ferrocene in the ratio of 1 benzoyl peroxide to 0.1 ferrocene in a quantity of 0.275 part by weight, and octylmethacrylate in a quantity of 2 parts by weight.

The anaerobic composition of the present invention permits obtaining 50 percent higher moments of friction in screw joints than can be achieved with the use of the prior art anaerobic compositions.

The redox initiator employed in the anaerobic composition of the present invention, which is a combination of benzoyl peroxide with ferrocene in a quantity of from 1:1 to 1:0.005, makes for the hardening of the composition on practically any solid surface, including cadmium or cadmium-plated ones, at normal temperature, simultaneously assuring a high level of strength. As distinct from the known accelerators used to promote hardening of anaerobic compositions on various metal surfaces, which are toxic substances or have an offensive odour (solutions of amines, isocyanates or salts of fatty acids with variable-valency metals), the initiating system in accordance with the present invention, viz. a combination of benzoyl peroxide with ferrocene, is non-toxic and gives off no offensive odour. Besides, as is going to be shown hereinafter, the initiating system of this invention, viz. benzoyl peroxide combined with ferrocene, imparts excellent storageability to the anaerobic composition which may be kept in a ready-for-use form.

The period of safe storage of the anaerobic composition in accordance with the present invention is 6 months at a temperature of 20° C.

Anaerobic compositions on the basis of oligocarbonateacrylates exhibit a high level of chemical resistance to solvents, such as toluene, acetone, ethanol or gasoline, and lose nothing of their strength for 3 months.

Anaerobic compositions on the basis of oligocarbonateacrylates are non-corrosive and resistant to tropical conditions.

Further merits and advantages of the proposed anaerobic compositions will be apparent from the following detailed description thereof.

As distinct from the prior art anaerobic compositions, the compositions of this invention feature improved strength due to their oligocarbonateacrylate component.

Thus, tested in screw pairs, the oligocarbonateacrylate-based composition was found to be superior in strength to one on the basis of oligoesteracrylate.

In order to compare the strength of anaerobic compositions with different constituents, an anaerobic composition was prepared in the following manner.

First, a mixture was prepared from 98 parts by weight of bis (metacrylhydroxyethylenecarbonate)tetraethyleneglycol and 2 parts by weight of octylmethacrylate. Then the mixture was divided into two halves, with 0.25 part by weight of benzoyl peroxide added to one part of the mixture (1) and 0.025 part by weight of ferrocene added to the other part (2). Prior to assembling screw pairs, mixture (1) was applied to the surface of the nut and mixture (2) to the surface of the bolt, after which the screw pair was put together. The assembled screw pairs were kept for 24 hours at room temperature.

An anaerobic composition the basis of bis (metacrylate) tetraethyleneglycol was utilized in a similar way.

The comparative data obtained under identical conditions are given in the following table.

Table 1

| Oligomer | Nut swivel angle | | | | |
| --- | --- | --- | --- | --- | --- |
| | 0° | 90° | 180° | 270° | 360° |
| | Moment of friction, kgf.cm | | | | |
| di(methacrylate) tetraethyleneglycol | 200 | 480 | 400 | 350 | 300 |
| bis(methacryloxyethylenecarbonate)tetraethyleneglycol | 300 | 600 | 550 | 480 | 380 |

The moment of friction is construed to mean the amount of torque providing for the rotation of the nut at various swivel angles.

The oligocarbonateacrylates employed in the manufacture of the anaerobic compositions of this invention have a high degree of purity, are resistant to prolonged storage and can be produced in commercial procedures.

The following compounds may be employed as the polymerizable oligocarbonateacrylates in accordance with the invention to produce the proposed anaerobic compositions:

I-bis(acryloxyethylenecarbonate) ethyleneglycol:

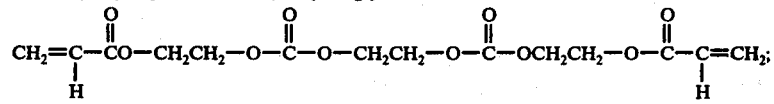

II-bis(acryloxyethylenecarbonate)diethyleneglycol:

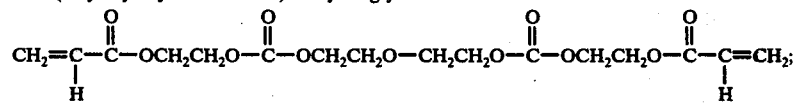

III-bis(acryloxyethylenecarbonate)triethyleneglycol:

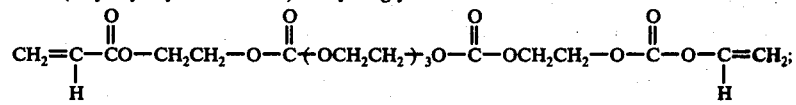

IV-bis(acryloxyethylenecarbonate)tetraethyleneglycol:

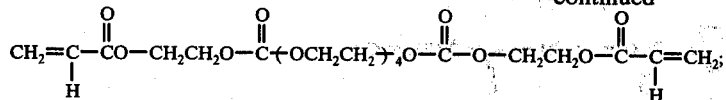

V-bis(acryloxyethylenecarbonate)butanediol-1,4:

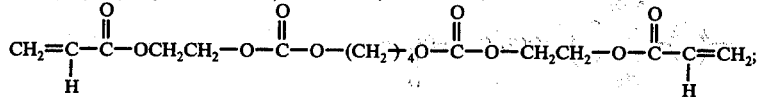

VI-bis(acryloxyethylenecarbonate)resorcin:

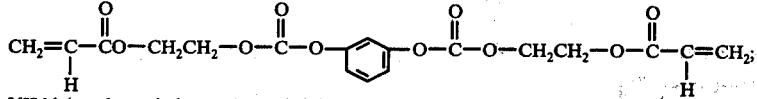

VII-bis(acryloxyethylenecarbonate)diphenylolpropane:

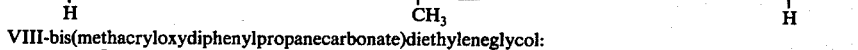

VIII-bis(methacryloxydiphenylpropanecarbonate)diethyleneglycol:

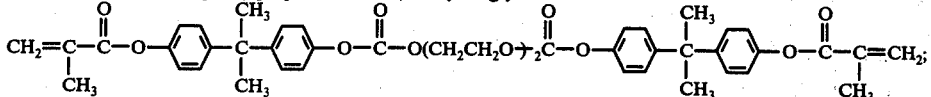

IX - bis(acryloxyethylenecarbonate)di-hydroxy-diphenylpropanecarbonate resorcin diphenylpropanecarbonate:

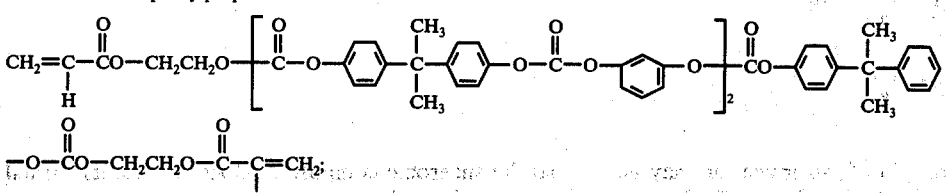

X - bis(methacryloxyethylenecarbonate)diethyleneglycol:

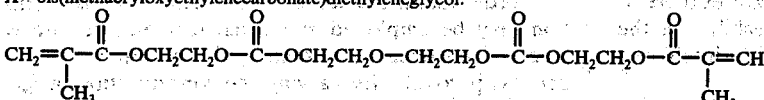

XI - bis(methacryloxyethylenecarbonate[di-carbonatediethyleneglycol])diethyleneglycol:

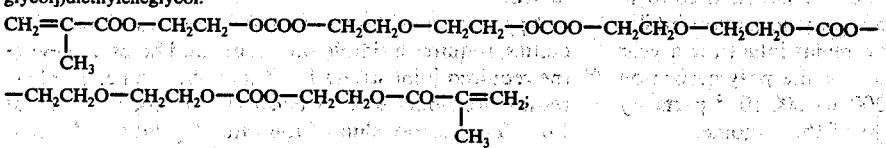

XII - bis(methacryloxyethylenecarbonate)tetraethyleneglycol:

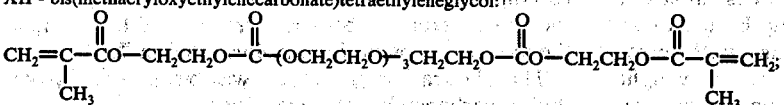

XIII - bis(methacryloxyethylenecarbonate)diphenylolpropane:

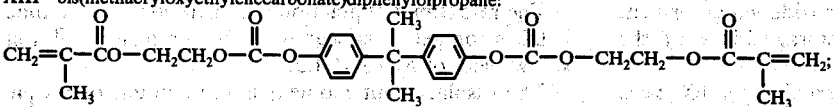

XIV - bis(chloroacryloxyethylenecarbonate)ethyleneglycol:

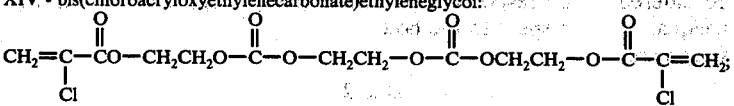

XV - bis(methacryloxyethylenecarbonate)resorcin:

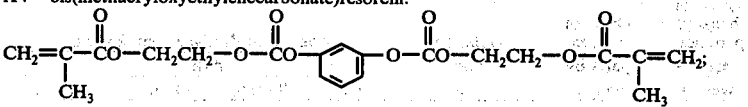

XVI bis(methacryloxyethylenecarbonate)propyleneglycol:

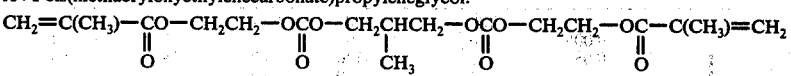

XVII bis(methacryloxyethylenecarbonate)1,2-tetradecanediol:

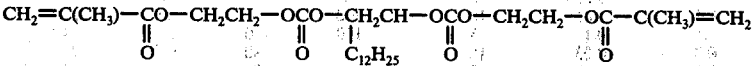

XVIII bis(methacryloxyethylenecarbonate)4,4'-dioxydiphenyloxide:

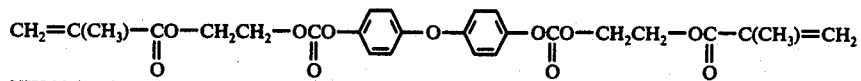

XIX bis(methacryloxyethylcarbonate)oxyethylenediphenylolpropane:

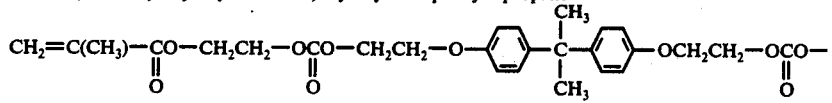

—CH₂CH₂—OC—C(CH₃)=CH₂
  ‖
  O

XX bis(methacryloxyethylenecarbonate)oxypropylene-p-xylyleneglycol:

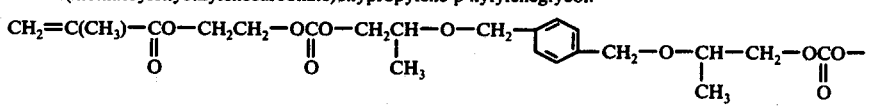

—CH₂CH₂—OC—C(CH₃)=CH₂
  ‖
  O

XXI tris(methacryloxyethelenecarbonate)glycerol:

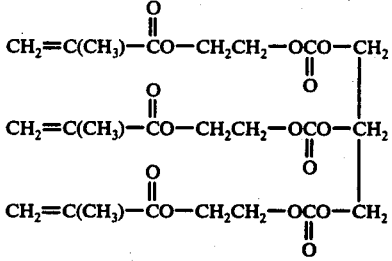

The anaerobic composition of this invention may be manufactured both on the basis of individual compounds listed above and on the basis of mixtures thereof.

In order to provide for a high storageability of the oligocarbonateacrylates, polymerization inhibitors, such as hydroquinone, benzoquinone or bis (5-methyl-3-tertiary butyl-2-oxyphenyl) methane, are added thereto in the course of manufacture; said polymerization inhibitors assure that the monomer remains intact for a year or longer. Usually, the quantity of the polymerization inhibitor used ranges from 200 to $300.10^{-4}$ parts by weight per 100 parts by weight of the oligomer.

Polymerization of oligocarbonateacrylates employed in anaerobic compositions is speeded up by use of an initiator, viz. benzoyl peroxide combined with ferrocene, taken in a ratio of from 0.05 to 1 part by weight per 100 parts by weight of the oligocarbonateacrylate. Larger quantities of benzoyl peroxide entail instant polymerization and reduce the storageability of the composition.

0.5 part by weight of benzoyl peroxide per 100 parts by weight of oligocarbonateacrylate may be considered as an optimal quantity, for it provides for adequately fast hardening of the oligocarbonateacrylate and assures that the anaerobic composition does not lose its normal properties in prolonged storage.

In order that the anaerobic composition of this invention may be employed at normal temperature, use is made of ferrocene accelerating the decomposition of benzoyl peroxide. By varying the concentration of ferrocene, practically any rate of hardening may be obtained.

Application of ferrocene entails no additional difficulties, requires a simple procedure and helps achieving the required joint strength within a short time. The best results are obtained at a benzoyl-to-ferrocene ratio of 1:0.1. The relationship of the rate of gelation of oligocarbonateacrylate and the rise in strength of the joint to the concentration of benzoyl peroxide and ferrocene in the anaerobic composition is illustrated in Table 2.

The oligocarbonateacrylate was bis(methacryloxyethylenecarbonate)triethyleneyolyeol.

The rate (time) of gelation is construed to be the time it takes for gel to appear on cadmium-plated bolt-nut screw pairs of M 10 × 1.5.

The displacement moment is the amount of torque corresponding to the initial displacement of the nut with respect to the bolt.

Table 2

| Qnty. of benzoyl peroxide, parts by weight | Qnty. of ferrocene, parts by weight | Gelation time, min | Moment of displacement, kgf.cm After | | | |
|---|---|---|---|---|---|---|
| | | | 10 min | 15 min | 30 min | 180 min |
| 1 | 2 | 3 | 4 | 5 | 6 | 7 |
| 1 | 0 | 4,720 | 0 | 0 | 0 | 0 |
| 1 | 0.005 | 40 | 0 | 0 | 0 | 100 |
| 1 | 0.05 | 2 | 120 | 150 | 180 | 240 |
| 1 | 0.1 | 1 | 200 | 230 | 260 | 280 |
| 0.5 | 0.005 | 50 | 0 | 0 | 0 | 80 |
| 0.5 | 0.05 | 10 | 100 | 140 | 200 | 280 |
| 0.5 | 0.1 | 3 | 120 | 140 | 220 | 240 |
| 0.3 | 0.03 | 15 | 0 | 80 | 140 | 200 |
| 0.1 | 0.005 | 90 | 0 | 0 | 0 | 10 |
| 0.1 | 0.05 | 30 | 0 | 0 | 30 | 100 |

Table 2-continued

| Qnty. of benzoyl peroxide, parts by weight | Qnty. of ferrocene, parts by weight | Gelation time, min | Moment of displacement, kgf.cm After | | | |
|---|---|---|---|---|---|---|
| | | | 10 min | 15 min | 30 min | 180 min |
| 1 | 2 | 3 | 4 | 5 | 6 | 7 |
| 0.1 | 0.1 | 20 | 0 | 0 | 50 | 120 |

Table 3 presents the results of testing of "bolt-nut" screw pairs put together by use of an anaerobic composition on the basis of an oligocarbonateacrylate, viz. bis(methacryloxyethylenecarbonate)diethyleneglycol, together with benzoyl peroxide and ferrocene, against the results achieved with the anaerobic composition "Loctite 54".

The anaerobic composition "Loctite 54" was tested both with and without the "Activator T" solidification accelerator manufactured by Loctite Corp.

From the data in the Table it is seen that the strength of the screw joint assembled by means of the "Loctite 54" anaerobic composition on titanium, aluminum and cadmium-plated surfaces in inadequately low, whereas the anaerobic composition which includes benzoyl peroxide as an initiating additive combined with ferrocene as an agent accelerating its decomposition quickly hardens on practically any surface, including the cadmium-plated one.

Table 3

| Screw pair material | Moment of fricton, kgf.cm | | |
|---|---|---|---|
| | Oligocarbonateacrylate-based comp. | Loctite 54 | |
| | | Without accelerator | With accelerator |
| Steel | 235 | 175 | 170 |
| Titanium | 190 | 20 | 145 |
| Aluminium | 175 | 20 | 80 |
| Cadmium-plated surface | 225 | 80 | 150 |

The plasticizers of the anaerobic composition in accordance with the invention are polymerizable esters of acids of acrylic series of the general formula

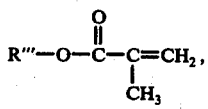

where R''' is alkyl radical $C_8$–$C_{12}$.

These esters are low-viscosity liquids which impart a measure of additional elasticity to the polymer.

If it is required to reduce the viscosity of the composition, these same substances may be employed as polymerizable diluents.

The level of the plasticizer, viz. a polymerizable ester, in the anaerobic composition of the invention varies from 2 to 5 parts by weight per 100 parts by weight of the oligocarbonateacrylate.

The present invention employs a mixture of methacrylic esters wherein R'''' is an alkyl radical $C_8$–$C_{12}$. Added in small quantities, these esters slightly impair the strength of the composition, the reason for which apparently should be sought in the improved elasticity of the polymer.

The present invention will be further understood from the following exemplary embodiments thereof.

EXAMPLES 1–7

These examples illustrate the way the mechanical properties of anaerobic compositions vary depending on the type of oligomer used. The composition was prepared as two mixtures. One mixture was made up of 98 parts by weight of the oligomer; 0.03 part by weight of the inhibitor, viz. bis[5-methyl-3-tertiary butyl-2-oxyphenyl]methane, plus 0.5 part by weight of benzoyl peroxide; and 2 parts by weight of octylmethacrylate.

The other mixture was prepared from 98 parts by weight of the oligomer of the first mixture; 0.03 part by weight of the inhibitor of the first mixture plus 0.05 part by weight of ferrocene; and 2 parts by weight of octylmethacrylate.

The first mixture was applied to one component of a screw pair (bolt or nut), whereas the other mixture was applied to the other component of the same pair, whereupon the screw pair was put together. The screw pairs employed in the examples were steel cadmium-plated bolt and nut of M 10 × 1.5.

The results given in Table 4 were obtained after the screw pairs had been kept for 24 hours at 20° C.

Table 4

| No. | Oligomer | Moment of friction, kgf.cm | | | | |
|---|---|---|---|---|---|---|
| | | 0° | 90° | 180° | 270° | 360° |
| 1. | Bis(acryloxyethylenecarbonate)ethyleneglycol | 200 | 580 | 400 | 350 | 300 |
| 2. | Bis(metacryloxyethylenecarbonate)diethyleneglycol | 220 | 600 | 550 | 400 | 380 |
| 3. | Bis(methacryloxyethylenecarbonate di-carbonate diethyleneglycol)diethyleneglycol | 420 | 380 | 360 | 340 | 320 |
| 4. | Bis(methacryloxyethylenecarbonate) tetraethyleneglycol | 300 | 600 | 550 | 480 | 380 |
| 5. | Bis(methacryloxyethylenecarbonate) diphenylolpropane | 280 | 550 | 520 | 500 | 480 |
| 6. | Bis(chloroacryloxyethylenecarbonate) diethyleneglycol | 260 | 620 | 580 | 500 | 400 |
| 7. | Bis(methacryloxyethylenecarbonate) resorcin | 240 | 540 | 500 | 480 | 450 |

EXAMPLE 8

0.5 part by weight of benzoyl peroxide was dissolved in a flask in a mixture of 100 parts by weight of bis [acryloxyethylenecarbonate]butanediol-1,4 and 0.02 part by weight of bis [5-methyl-3-tert.butyl-2-oxyphenyl]methane. In another flask, 0.05 part by weight of ferrocene was dissolved in 100 parts by weight of bis(acryloxyethylenecarbonate)butanediol and 0.02 part by weight of bis(5-methyl-3-tertiary butyl-2-oxyphenyl)methane. Then two solutions were prepared with a concentration of octylmethacrylate in bis(oxyethylenecarbonate)butanediol-1,4 of 2 and 5 parts by weight, respectively, per 100 parts by weight of the oligocarbonateacrylate; benzoyl peroxide and ferrocene were also added to these solutions, as described hereabove, in the same amounts.

The solution containing benzoyl peroxide was applied to the bolt while that containing ferrocene was applied to the nut of a screw pair, after which the nut was screwed on the bolt and the screw pairs were kept at 20° C. for 24 hours.

The results of bolt unscrewing are given in Table 5.

Table 5

| Qnty. of octyl-methacrylate, parts by weight per 100 parts by weight of oligcarbonateacrylate | Nut swivel angle | | | | |
|---|---|---|---|---|---|
| | 0° | 90° | 180° | 270° | 360° |
| | Moment of friction, kgf.cm | | | | |
| 0 | 320 | 550 | 500 | 440 | 380 |
| 2 | 300 | 530 | 490 | 450 | 400 |
| 5 | 250 | 480 | 430 | 40 | 330 |

EXAMPLE 9

48 parts by weight of bis[methacryloxyethylenecarbonate]tetraethyleneglycol, 2 parts by weight of octyl-methacrylate and 0.03 part by weight of bis[5-methyl-3-tertiary butyl-2-oxyphenyl]methane were added to 50 parts by weight of bis[methacryloxyethylenecarbonate]diphenylolpropane. The resultant solution was divided into two halves, with 0.25 part by weight of benzoyl peroxide being added to one half while 0.025 part by weight of ferrocene being added to the other half. In a procedure duplicating that of Examples 1-7, the composition was applied to the bolt and nut of a screw pair, after which the screw pair was assembled, kept for 24 hours at room temperature, and taken apart.

Table 6 presents the magnitudes of the moment of friction at various nut swivel angles compared against the data obtained in the unscrewing of bolts assembled with the aid of the "Loctite 54" anaerobic composition, kept for 24 hours at room temperature and then heated for 1 hour to 100°.

Table 6

| | | Nut swivel angle | | | | |
|---|---|---|---|---|---|---|
| | | 0° | 90° | 180° | 270° | 360° |
| No. | Composition | Moment of friction, kgf.cm | | | | |
| 1. | Bis(methacryloxyethylenecarbonate)diphenylolpropane-based composition | 340 | 650 | 620 | 580 | 550 |
| 2. | Loctite 54 | 220 | 480 | 420 | 380 | 360 |

EXAMPLE 10

In a procedure duplicating that described in Examples 1-9, an anaerobic composition was prepared from 98 parts by weight of bis[methacryloxyethylenecarbonate]diethyleneglycol, 2 parts by weight of octylmethacrylate, 0.275 part by weight of a mixture of benzoyl peroxide with ferrocene in the proportion 1 part benzoyl peroxide to 0.1 part ferrocene, and 0.03 part by weight of bis[5-methyl-3-tertiary butyl-2-oxyphenyl]methane.

The results of tests are given in Table 7.

Table 7

| Nut swivel angle | 0° | 90° | 180° | 270° | 360° |
|---|---|---|---|---|---|
| Moment of friction, kgf.cm | 225 | 575 | 500 | 450 | 380 |

What is claimed is:

1. An anaerobic composition on the basis of a polymerizable oligomer of the acrylic series, consisting of at least one oligocarbonateacrylate of the general formula $$CH_2=C(X)COORO[COOR'OCOOR'']_n\text{-}COOR'OCOOROCOC(X)=CH_2,$$

where
X is a radical selected from the group consisting of —H, —CH$_3$ and a halogen;
R is a radical selected from the group consisting of glycol and bisphenol radicals;
R' is a radical selected from the group consisting of glycol, bisphenol and polyol radicals;
R'' is a radical selected from the group consisting of alkyl and aryl radicals;
n is equal to 0 or 1,
taken in a quantity of 98 parts by weight; a polymerization inhibitor, bis[5-methyl-3-tertiary butyl-2-oxyphenyl]methane, taken in a quantity of from 0.02 to 0.03 part by weight; a polymerization initiator, benzoyl peroxide, combined with a polymerization accelerator, ferrocene, in the ratio of from 1:1 to 1:0.005 taken at the rate of from 0.05 to 1 part by weight; and a plasticizer, a polymerizable ester of acrylic acid of the formula $$R'''-OOC-C(CH_3)=CH_2,$$

where R''' is alkyl radical $C_8$—$C_{12}$, taken in a quantity of from 2 to 5 parts by weight.

2. An anaerobic composition as set forth in claim 1, wherein the plasticizer is octylmethacrylate.

3. An anaerobic composition, consisting essentially of two polymerizable oligocarbonateacrylates, bis[methacryloxyethylenecarbonate]tetraethyleneglycol in a quantity of 48 parts by weight and bis[methacryloxyethylenecarbonate]diphenylolpropane in a quantity of 50 parts by weight; a polymerization inhibitor, bis[5-methyl-3-tertiary butyl-2-oxyphenyl]methane in a quantity of 0.03 part by weight; a polymerization initiator, benzoyl peroxide, combined with a polymerization accelerator, ferrocene, taken in a ratio of 1 benzoyl peroxide to 0.1 ferrocene in a quantity of 0.275 part by weight; and a plasticizer, octylmethacrylate, in a quantity of 2 parts by weight.

4. An anaerobic composition, consisting essentially of 98 parts by weight of bis[methacryloxyethylenecarbonate]diethyleneglycol; 0.03 part by weight of bis[5-methyl-3-tertiary butyl-2-oxyphenyl]methane; 0.275 part by weight of benzoyl peroxide combined with ferrocene in a ratio of 1 benzoyl peroxide to 0.1 ferrocene; and 2 parts by weight of octylmethacrylate.

* * * * *